United States Patent
Rohlfing et al.

(10) Patent No.: US 9,548,914 B2
(45) Date of Patent: Jan. 17, 2017

(54) ESTIMATING LINE RATE

(71) Applicant: BRITISH TELECOMMUNICATIONS PUBLIC LIMITED COMPANY, London (GB)

(72) Inventors: David Michael Rohlfing, London (GB); Philip Antony Everett, London (GB); Ashley Pickering, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 36 days.

(21) Appl. No.: 14/388,961

(22) PCT Filed: Mar. 20, 2013

(86) PCT No.: PCT/GB2013/000123
§ 371 (c)(1),
(2) Date: Sep. 29, 2014

(87) PCT Pub. No.: WO2013/144540
PCT Pub. Date: Oct. 3, 2013

(65) Prior Publication Data
US 2015/0063141 A1     Mar. 5, 2015

(30) Foreign Application Priority Data

Mar. 29, 2012  (EP) .................... 12250076

(51) Int. Cl.
*H04L 12/26* (2006.01)
*H04M 3/30* (2006.01)
*H04B 3/46* (2015.01)

(52) U.S. Cl.
CPC .......... *H04L 43/0882* (2013.01); *H04M 3/306* (2013.01); *H04B 3/46* (2013.01)

(58) Field of Classification Search
None
See application file for complete search history.

(56) References Cited

U.S. PATENT DOCUMENTS 6,819,746 B1   11/2004  Schneider et al.
7,391,780 B1   6/2008   Stone et al.
(Continued)

OTHER PUBLICATIONS

International Search Report for PCT/GB2013/000123, mailed Sep. 16, 2013.

*Primary Examiner* — Chi H Pham
*Assistant Examiner* — Shick Hom
(74) *Attorney, Agent, or Firm* — Nixon & Vanderhye P.C.

(57) ABSTRACT

The invention measures the rates of a whole population of existing lines together with a line characteristic, such as capacitance, that can be measured prior to provisioning. Using these measures, a rating we refer to as a "quality figure" is generated for each distribution point by looking at the rate of the lines running through that distribution point, and comparing those rates to the rates of other lines having the same line characteristic across the whole population of lines. Distribution points that have lines operating better (faster) than the average for their given line characteristic will have higher quality figures. To estimate the rate of a new line, the quality figure of the distribution point that the new line passes through is used in conjunction with the measured line characteristic as a look up on the whole population of lines.

5 Claims, 6 Drawing Sheets

(56) References Cited

U.S. PATENT DOCUMENTS

2002/0122424 A1* 9/2002 Kawarai et al. .............. 370/394
2007/0002758 A1   1/2007 Blackburn et al.
2009/0022213 A1* 1/2009 Shi ............................... 375/219
2010/0158200 A1   6/2010 Marigliano et al.

* cited by examiner

ESTIMATING LINE RATE

This application is the U.S. national phase of International Application No. PCT/GB2013/000123 filed 20 Mar. 2013 which designated the U.S. and claims priority to EP Patent Application No. 12250076.2 filed 29 Mar. 2012, the entire contents of each of which are hereby incorporated by reference.

FIELD OF THE INVENTION

This invention relates to estimating line rates, in particular a method of estimating the rate of a digital subscriber line in a network.

BACKGROUND TO THE INVENTION

Digital Subscriber Line (DSL) technology, often referred to as "broadband", is a family of services that provide digital data transmission over the metallic twisted copper pairs that form the telephone lines in a local telephone network. DSL is commonly used to provide a customer's home with a network connection, typically to the Internet via an ISP.

The rate, or speed, of a broadband line depends on a number of factors, including the length of the telephone line over which the service operates, and the general quality of the line. Other factors that affect the rate include external factors such as interference.

Predicting broadband line rates can be a challenge. If a telephone line has had broadband provisioned on it before, then the rate for the previous line can be used as a guide. However, if this is not available, then current methods simply average existing broadband line rates from the same exchange or region. This tends to result in estimates that rarely match the actual outcome. Some techniques are slightly more sophisticated, and group all lines having a similar line characteristic, and the select the minimum rate that say 80% of the lines can reach.

Even though there are clear technical difficulties in estimating the rate of a broadband line, there is still a growing expectancy for line rate predictions to be more accurate and not simply quote some potential (advertising) maximum.

SUMMARY OF THE INVENTION

It is the aim of embodiments of the present invention to provide an improved method of estimating the rate of a digital subscriber line.

According to one aspect of the present invention, there is provided a method of estimating the rate of a digital subscriber line in a network, wherein the network comprises a plurality of digital subscriber lines and a plurality of distribution points, and each of the plurality of digital, subscriber lines passes through one of the plurality of distribution points, said method comprising:
(i) identifying a digital subscriber line to estimate the rate of, and determining a line characteristic value associated with said identified line;
(ii) identifying the distribution point over which the identified digital subscriber line is carried;
(iii) determining a quality figure for each of the plurality of digital subscriber lines, where each of the digital subscriber lines has an associated line characteristic value and line rate value, and wherein the quality figure is dependent on the line rate value associated with the respective digital subscriber, line when compared to the line rate values of all the digital subscriber lines in the network having a similar line characteristic value;
(iv) generating a population plan comprising the quality figure for each of the plurality of digital subscriber lines in the network together with the line characteristic value and line rate of the respective digital subscriber line.
(v) determining a quality figure for the identified distribution point based on the quality figure of each of the digital subscriber lines passing through said identified distribution point;
(vi) estimating the rate of the identified digital subscriber line by using the line characteristic value associated with said identified digital subscriber line, together with the determined quality figure of the identified distribution point, to look-up a line rate value from the population plan.

The line characteristic may be indicative of the length of the digital subscriber line. The line characteristic may be measurable prior to service provision.

Typically, the population plan is generated for a single service profile, based on digital subscriber lines operating with that profile, and the identified digital subscriber line is one that operates or will operate with that profile.

The line rate value may be the downstream rate.

Further, the line characteristics associated with the plurality of lines may be subdivided into a plurality of line characteristic bins, and wherein a digital subscriber line having a similar line characteristic to another digital subscriber line is one that has a line characteristic in the same line characteristic bin.

The invention provides a way to estimate the rate of a digital subscriber line where no service has been provisioned before. This is made possible as the estimation utilises a line characteristic measurement that is available without a prior service provision. For example, a physical characteristic such as capacitance.

The method can be used also for proactive fault detection, by measuring actual rate and comparing it to the estimated rate. If the actual rate is less than the estimated rate, then there may potentially be a fault, and the line can be flagged for further investigation.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

In examples of the present invention there is proposed an improved method of estimating the rate of a broadband line, and can be applied to lines that have yet to be provisioned. The general concept is to give a rating to a distribution point (cabinet, pole, branch point, etc) through which the new line passes, with the rating based on the performance of lines through that distribution point, considered with respect to the lines of a general population.

Specifically, the method measures the rates of a whole population of existing lines together with a line characteristic, such as capacitance, that can be measured prior to provisioning. Using these measures, a rating we refer to as a "quality figure" is generated for each distribution point by looking at the rate of the lines running through that distribution point, and comparing those rates to the rates of other lines having the same line characteristic across the whole population of lines. Distribution points that have lines operating better (faster) than the average for their given line characteristic will have higher quality figures. To estimate the rate of a new line, the quality figure of the distribution point that the new line passes through is used in conjunction with the measured line characteristic as a look up on the whole population of lines, which have also been given quality figures according to their line characteristic and line rate measurements.

Figure 1:
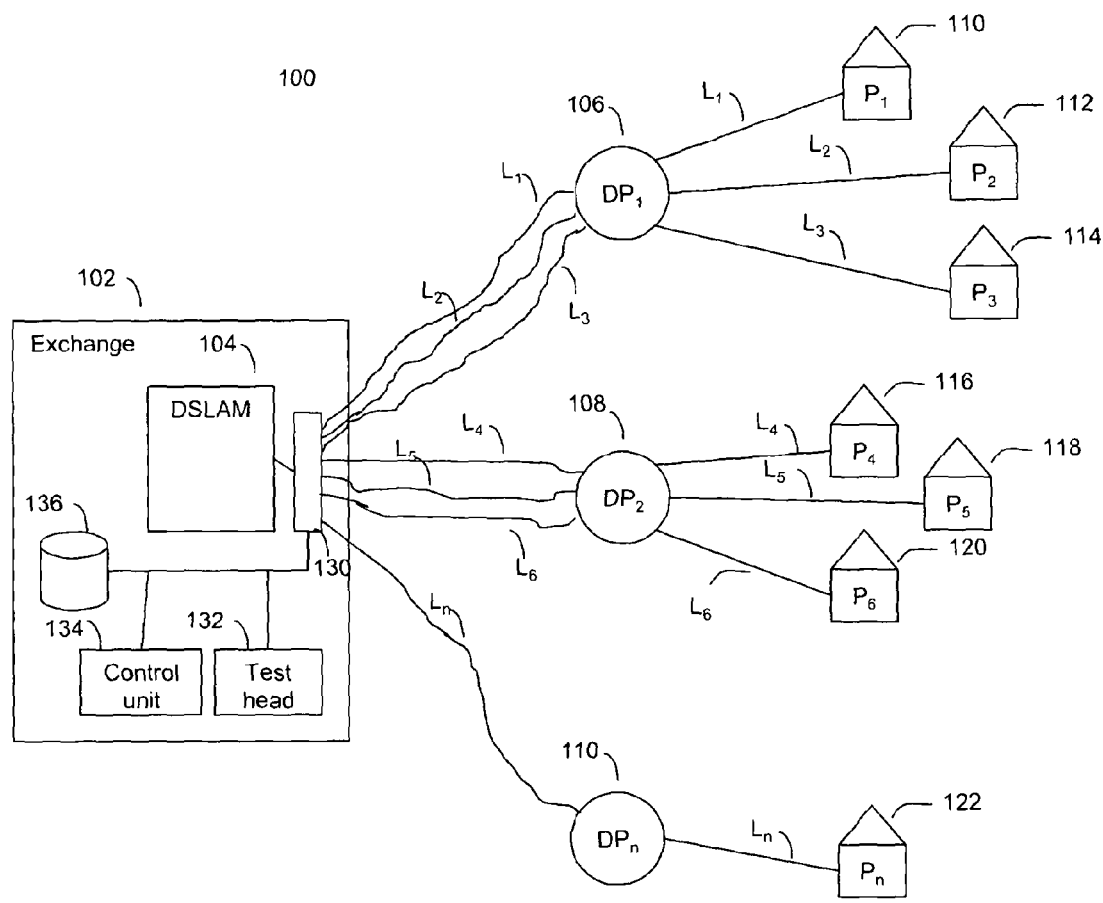
FIG. 1 is system diagram showing a telephone exchange and connections to a number of customer premises via distribution points.

FIG. 1 illustrates a telecommunications network 100 comprising a telephone exchange 102, and a digital subscriber line access multiplexer, DSLAM, 104 located in the telephone exchange 102. A number telephone lines, $L_1$, $L_2$, $L_3$ ... $L_n$, providing PSTN telephone services, are connected to the DSLAM 104. The telephone lines are typically made of twisted copper pairs. The DSLAM 104 provides high speed broadband communications to the connected telephone lines. These broadband communications are typically digital subscriber line, DSL, communications.

Whilst a DSLAM has been shown here, similar services may be provided by alternative nodes, such as a MSAN (Multi-Service Access Node), depending on the network configuration.

The network 100 also comprises a number of distribution points DPs-$DP_1$ 106, $DP_2$ 108, and $DP_n$ 110. A DP may be a telephone pole, street cabinet, or other similar node where telephone lines are aggregated before being carried towards their final destinations. Here, lines $L_1$, $L_2$ and $L_3$, are connected to $DP_1$ 106, before onward connection to customer premises $P_1$ 110, $P_2$ 112, and $P_3$ 114 respectively. Similarly, lines $L_4$, $L_5$ and $L_6$ are connected to $DP_2$ 108, before onward connection to customer premises $P_4$ 116, $P_5$ 118, and $P_6$ 120 respectively. And finally line $L_n$ is connected to $DP_n$ 110, before onward connection to customer premises $P_n$ 122.

The network 100 includes other lines and other DPs not shown in this example for the sake of simplicity.

Within the exchange 102, the telephone lines are connected to the DSLAM 104 via a switch 130. The switch 130 serves to selectively connect any one or more of the lines to test head equipment 132. Under normal operation, the switch 130 operates to connect the telephone lines to the DSLAM 104, thus providing the connected customer premises with broadband services. The test head 132 can be brought in circuit with any one of the telephone lines by switching the switch 130 under the control of the control unit 134. The test head equipment 132 can perform various measurements on the connected lines as will be described later. Switching over to the test head equipment 132 is usually only from the PSTN service, with any xDSL services being maintained. The test head equipment 132 and switch 130 are controlled by the control unit 134, which typically comprises a processor running a suitably configured computer program. A data store 136 is also provided, which can store measurements from the test head equipment 136, as well as any other parameters generated by the control unit 134 during operation. The data store may be a hard disk or similar.

The present invention comprises 3 general steps:
1. Create whole population quality plan
2. Generate quality ratings for each DP
3. Estimate line rate The operation of each of these general steps will now be described with reference to the flow charts of FIGS. 2 to 4. Unless otherwise stated, the processing described by these flow charts is done by the control unit 134.

Figure 2:
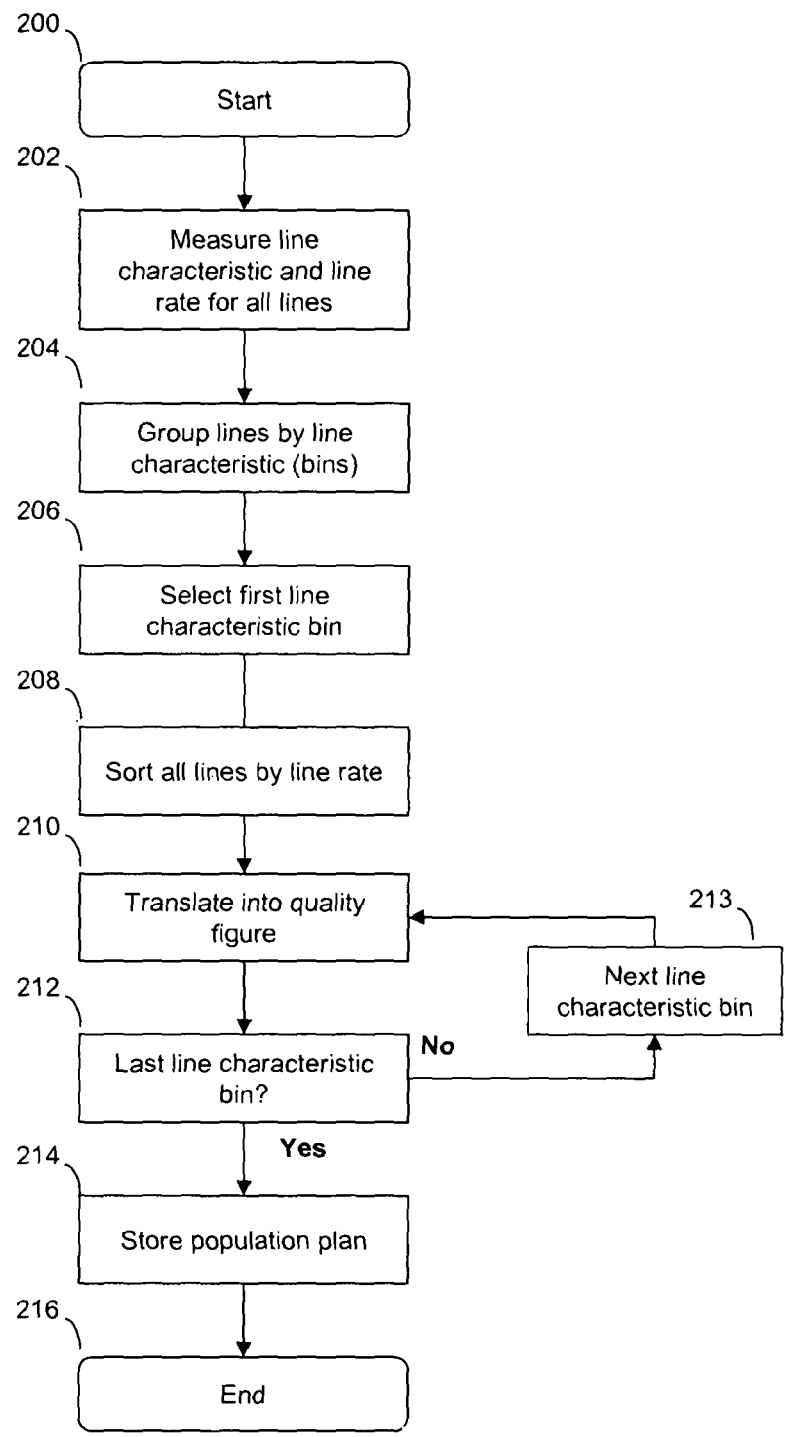
FIG. 2 is a flow chart showing the steps of generating a population plan in an example of the invention.

FIG. 2 is a flow chart illustrating the steps of creating a whole population plan for the lines in the network 100. The whole population plan maps a measured line characteristic and line speed, for each line in the network, to a quality figure. The quality figure provides a measure of how fast the line speed is for a given line compared to other lines having a similar line characteristic. This will be described in more detail below.

In step 200, the processing starts.

In step 202, a line characteristic, or parameter associated with each of the lines $L_1$, $L_2$ ... $L_n$, is measured. The line characteristic measured here is the capacitance of the line, which provides an indication of the line length. Other parameters can be used instead, though one condition is that parameter can be measured prior to the provisioning of a line with the appropriate DSL service. Thus, physical line characteristics like capacitance are more suitable than parameters such as signal to noise ratio margin, or upstream/downstream attenuation, which cannot be measured until a DSL service is actually provided onto a line. This is important, as the same line characteristic will be measured for the line we are trying to estimate the rate of later, which may not have a DSL service provisioned to it yet:

In alternative example, line characteristic could be determined from knowledge of the physical route of the line. For example, an estimation of line length might be used as the "line characteristic", based on the actual path taken by the line. Again, this measure is available prior to a service being provisioned on the line.

The line characteristic is measured by the test head equipment 132, for each of the lines $L_1$, $L_2$ ... $L_n$ connected to the exchange. The DSL rate of the line is also measured. The rate measured, is the DSL downstream sync rate, and is obtained via the data collection that occurs at the DSLAM. The line characteristic measurements are performed under the control of the control unit 134, which acts to switch in the test head equipment 134 via the switch 130. The results of the measurements are stored in the data store 136.

Table 1 below shows an example of the data collected and stored.

TABLE 1

| Line ID | Line characteristic (capacitance in nF) | Downstream line rate in kbp/s |
|---|---|---|
| $L_1$ | 85 | 2400 |
| $L_2$ | 59 | 8128 |
| $L_3$ | 5 | 1728 |
| $L_4$ | 30 | 8128 |
| $L_5$ | 37 | 8128 |

TABLE 1-continued

| Line ID | Line characteristic (capacitance in nF) | Downstream line rate in kbp/s |
|---|---|---|
| $L_6$ | 244 | 2944 |
| ... | ... | ... |
| $L_n$ | $x_n$ | $y_n$ |

In this example, for a given line, $L_n$, the line characteristic is given by $x_n$, and the line rate by $y_n$.

In step 204, the data from Table 1 is grouped by line characteristic into bins of fixed width. In this example, the bins are 10 nF for the line characteristic of capacitance. Thus, all lines having capacitance of 0-10 nF are collected together in the first bin, 11-20 nF lines in the second bin and so on.

Whilst the bin spacing does determine how many lines there are in each bin, the spacings are ideally chosen so that there will be enough instances in each bin for evaluation. In the case of capacitance, which is indicative of line length, a line of 1 km has a capacitance of around 60 nF. Thus, a bin width of 10 nF gives around 6 bins per km, and since most lines reach up to around 7 km, this gives around 40 bins—enough to maintain accuracy without making the whole population plan tables too large.

Figure 5:
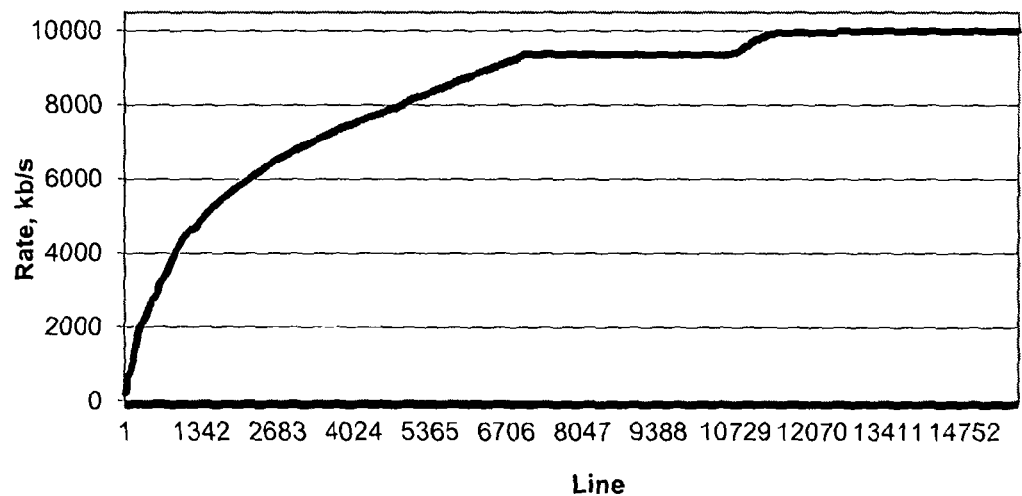
FIG. 5 is a graph showing a number of lines in a line characteristic bin, sorted by line rate.

In step 206, the first line characteristic bin is selected. In this example, it is the line characteristic bin 0-10 nF. The lines in this bin are then sorted by the measured line rates in step 208. FIG. 5 shows in graphical form an example of a number of lines sorted according to step 208, with "lines" along the x-axis, and the "line rate" on the y-axis.

Figure 6:
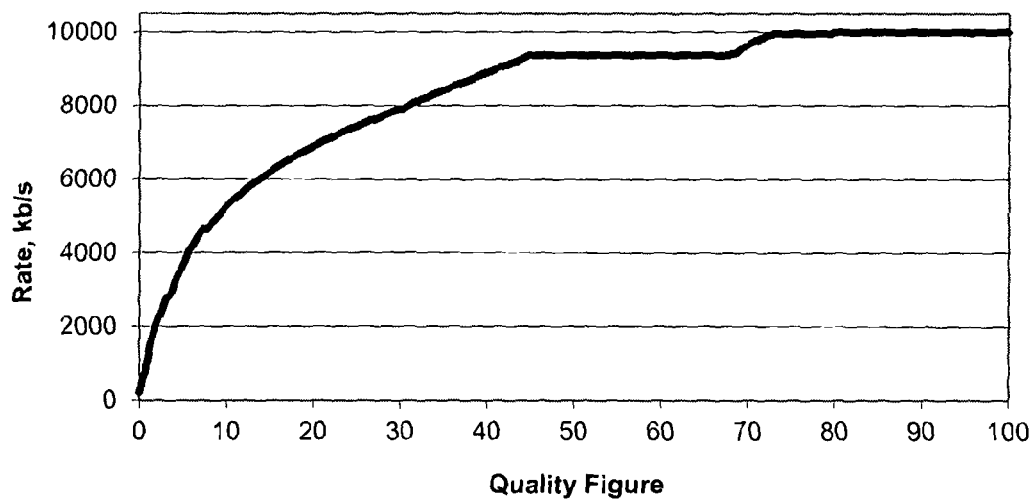
FIG. 6 is a graph showing a number of lines in a line characteristic bin, sorted by line rate, and assigned a quality figure

In step 210, the lines in the characteristic bin are translated into quality ratings. This is done by sub-dividing the lines into percentiles, representing a quality figure. This is illustrated graphically in the example in FIG. 6, which is similar to FIG. 5, but with the label of "lines" on the x-axis replaced by "quality figure". Thus, the quality figure provides a measure of how fast a line is compared to the other lines. The use of the quality figure in estimating the rate of a new line will be described later.

In step 212, a check is performed to determine if all line characteristic bins have been processed. If not, then in step 213, the next line characteristic bin is examined, and processing returns to 210. Processing of the bins continues until the last one is complete, after which step 214 is triggered, and the control unit 134 stores all the results in data store 136, which is referred to as the whole population plan. Described another way, the whole population plan provides a picture of the variation of downstream line rate with line characteristic for lines of equivalent quality. For example, selecting the points with quality rating 50 will show the rate dependence of the median of the population. It is essential to have a method such as this, because the range of rates observed at a given line characteristic can be quite large making predictions difficult.

Table 2 below shows a whole population plan

TABLE 2

| Line characteristic (capacitance in nF) | Line Rate | Quality figure |
|---|---|---|
| 10 | 864 | 1 |
| 10 | 1440 | 2 |
| 10 | 2080 | 3 |
| ... | ... | ... |

TABLE 2-continued

| Line characteristic (capacitance in nF) | Line Rate | Quality figure |
|---|---|---|
| 10 | 5400 | 60 |
| ... | ... | ... |
| 10 | 8128 | 98 |
| 10 | 8128 | 99 |
| ... | ... | ... |
| ... | ... | ... |
| 50 | 1152 | 1 |
| ... | ... | ... |
| 50 | 8128 | 99 |
| ... | ... | ... |

It should be noted that the method described so far, and the associated whole population plan in Table 2, is for a single xDSL profile.

Various xDSL profiles might be available, for example profiles for each of ADSL1, ADSL2, ADSL2+ (capped and uncapped), and so on. As the behaviour of lines operating in each profile can be quite different from another profile, it is important to separate lines of each profile. In other words, each profile is implemented differently, and will result in different line rate expectations for a given line characteristic. Thus, a whole population plan is generated per profile, using only lines from that profile, and for use in estimating the line rate of a line that will (or does) operate with that profile.

Figure 7:
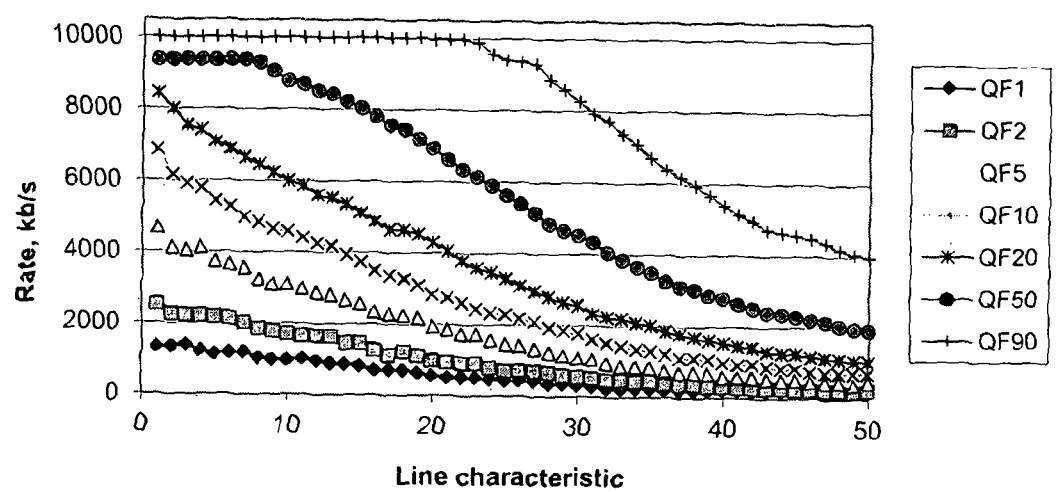
FIG. 7 is a graph showing a whole population plan with lines grouped by quality figure.

FIG. 7 shows in graphical form the whole population plan, plotted with line characteristic against line rate for each of a number of quality figures.

Figure 3:
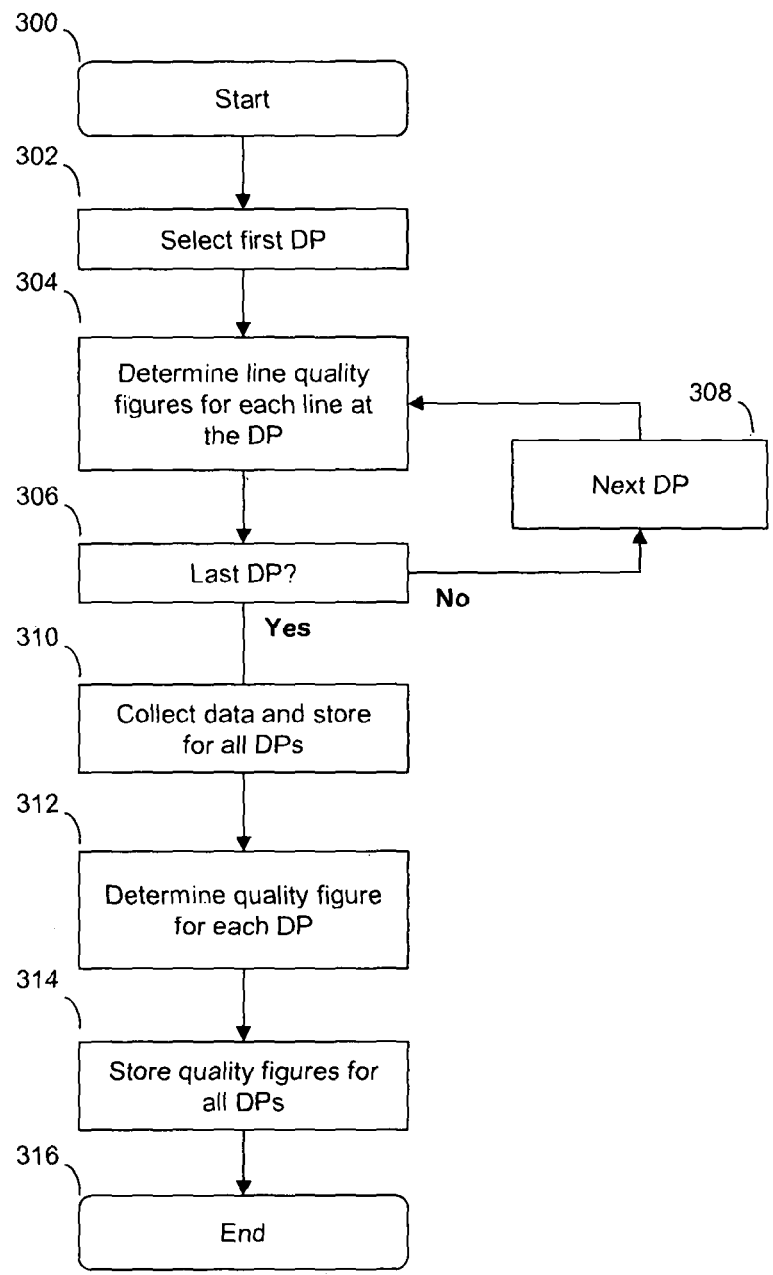
FIG. 3 is a flow chart illustrating the steps of generating a speed rating for a distribution point.
Figure 4:
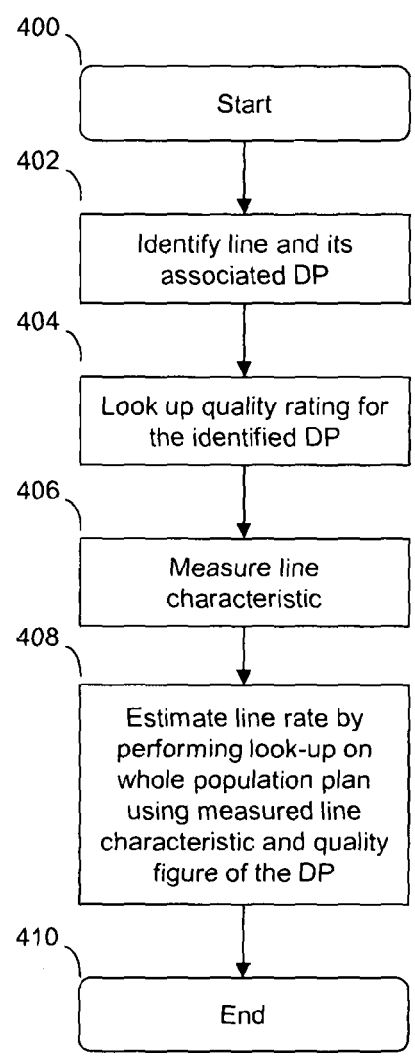
FIG. 4 is a flow chart illustrating the steps of estimating the rate of a line using the distribution point speed ratings.

FIG. 3 illustrates the steps of generating a quality figure for each DP. The quality figure is indicative of how well the lines in that DP perform with reference to the lines in the general population. It is not simply whether the lines in that DP are faster than the general population, but instead looks, at whether the lines are faster (or slower) for other lines with the same line characteristic. This is achieved by using the quality figures for each line in the population plan.

Processing starts in step 300.

In step 302, the first DP to be analysed is selected. In this example, $DP_1$ is first selected. Then in step 304, a quality rating for each line running through $DP_1$ is determined. The line characteristic and speed of each line is measured under control of the control unit 134 using the test head 132. For example, $L_1$ is measured, with a resulting line characteristic of 85 nF and line rate of 2400 kb/s. The measurements from step 202 can be used instead of being measured again (see results in Table 1). The measured line characteristic and rate are then used as a look-up on the whole population plan (see Table 2) to determine a quality figure. For example, $L_1$ with a measured characteristic of 85 nF and line rate of 2400 kb/s, using the whole population plan, might map onto a quality figure of 25. Should there not be an exact match in the population plan for either the line characteristic or the line rate, then the closest record could be used, or alternatively the next lowest/highest.

In step 306, a check is made to see if all the DPs have been processed, and if not step 308 selects the next DP ($DP_2$) and step 304 onwards repeated until all the DPs have been processed. Once all DPs have been processed, step 310 is triggered, and all the data for the DPs are stored in the data store 136. Table 3 below is an example of the data stored, and shows a list of the DPs with the line IDs of the associated lines and their respective quality figures as determined in step 304. The lines for each DP are sorted by quality figure.

TABLE 3

| DP | Line ID | Quality figure |
|---|---|---|
| ... | ... | ... |
| $DP_2$ | ... | 10 |
| $DP_2$ | ... | 55 |
| $DP_2$ | ... | 65 |
| $DP_2$ | ... | 65 |
| ... | ... | ... |

Then, in step 312, a quality figure is determined for each DP. This is done by taking the average quality figure for all the lines operating through that DP. The average could be the statistical mean or median for example. By using the median for example, we eliminate anomalously small or large quality figures. Such an approach is preferable. Using the results shown in Table 3 as an example, the quality figures for the lines of $DP_2$ are 10, 55, 65 and 65. Taking the median of those ratings, gives $DP_2$ a quality rating of 60.

In step 314, the quality figures calculated for each DP are collated and stored in data store 136. Table 4 below is an example of such a table.

TABLE 4

| DP | Quality rating |
|---|---|
| $DP_1$ | 80 |
| $DP_2$ | 60 |
| $DP_3$ | 40 |
| ... | ... |

The generating of quality rating for each DP is completed in step 316.

The final stage of the method is to estimate the rate of a line using the whole population plan together with the quality ratings determined for the DPs. The steps of performing the estimation are set out in the flow chart of FIG. 4.

In step 400, processing begins.

In step 402, a line is identified where a rate estimate is required. This may be a new line where no previous xDSL service has been provided, or a line with an existing service. The DP through, which the line passes is also identified. In this example, let's assume the identified line passes through $DP_2$.

In step 404, the quality rating for the identified $DP_1$ here $DP_2$, is determined. This is done by retrieving and examining the stored list of DPs and their associated quality ratings (see Table 4). Here, the quality rating for $DP_2$ is 60.

In step 406, the line characteristic of the identified line is measured by the test head 132 under the control of the control unit 134. In this example, the measured line characteristic is 10 nF.

In step 408, the rate of the identified line is estimated by performing a look-up on the whole population plan (Table 2) using the measured line characteristic, 10 nF, and the quality rating for the associated DP ($DP_2$) of 60. The whole population plan (Table 2) is retrieved from the store, and the result of the look-up is the entry in row 5 of Table 2, resulting in an estimated rate of 5400 kb/s. The estimated rate can be the exact figure retrieved from the whole population plan, or the figure can be rounded in some way, for example to the next lowest 100 kb/s.

Processing finishes at step 410.

The population plan is preferably updated at regular intervals. This is particularly important with population of lines that change a lot, as the population plan should reflect the properties of the current population of lines. Similarly, the quality figures for the DPs should also be kept up to date.

Thus, examples of the present invention propose a method of estimating the rate of a digital subscriber line, and can be applied to a line that has yet to be provisioned with a DSL service. The method is based on giving a rating to a distribution point through which the line passes, with the rating based on the performance of all the lines through that distribution point, considered with respect to the lines of a general population. The rating of the distribution point is used together a line characteristic value of that line (such as capacitance), to look-up from a population plan of all lines, a line rate.

Exemplary embodiments of the invention are realised, at least in part, by executable computer program code which may be embodied in an application program data. When such computer program code is loaded into the memory of a CPU in the control unit 134, it provides a computer program code structure which is capable of performing at least part of the methods in accordance with the above described exemplary embodiments of the invention.

A person skilled in the art will appreciate that the computer program structure referred can correspond to the flow charts shown in FIGS. 2 and 3, where each step of the flow chart can correspond to at least one line of computer program code and that such, in combination with the CPU in the control module 134, provides apparatus for effecting the described process.

In general, it is noted herein that while the above describes examples of the invention, there are several variations and modifications which may be made to the described examples without departing from the scope of the present invention as defined in the appended claims. One skilled in the art will recognise modifications to the described examples.

What is claimed is:

1. A method of estimating the rate of a digital subscriber line in a network, wherein the network comprises a plurality of digital subscriber lines and a plurality of distribution points, and each of the plurality of digital subscriber lines passes through one of the plurality of distribution points, said method comprising:
   (i) identifying a digital subscriber line to estimate the rate of, and determining a line characteristic value associated with said identified line;
   (ii) identifying the distribution point over which the identified digital subscriber line is carried;
   (iii) determining a quality figure for each of the plurality of digital subscriber lines, where each of the digital subscriber lines has an associated line characteristic value and line rate value, and wherein the quality figure for each digital subscriber line is dependent on the line rate value of the digital subscriber line when the line rate value is compared to the line rate values of all the digital subscriber lines in the network having a similar line characteristic value;
   (iv) generating a population plan comprising the quality figure for each of the plurality of digital subscriber lines in the network together with the line characteristic value and line rate of the respective digital subscriber line;
   (v) determining a quality figure for the identified distribution point based on the quality figure of each of the digital subscriber lines passing through said identified distribution point;
   (vi) estimating the rate of the identified digital subscriber line by using the line characteristic value associated with said identified digital subscriber line, together with the determined quality figure of the identified distribution point, to look-up a line rate value from the population plan.

2. The method according to claim 1, wherein the line characteristic is indicative of the length of the digital subscriber line.

3. The method according to claim 2, wherein the line characteristic is measurable prior to service provision.

4. The method according to claim 1, wherein the population plan is generated for a single service profile, based on digital subscriber lines operating with that profile, and the identified digital subscriber line is one that operates or will operate with that profile.

5. The method according to claim 1, wherein the line rate value is the downstream rate.

* * * * *